(12) United States Patent
Ferris (10) Patent No.: US 9,930,138 B2
(45) Date of Patent: Mar. 27, 2018

(54) COMMUNICATING WITH THIRD PARTY RESOURCES IN CLOUD COMPUTING ENVIRONMENT

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 832 days.

(21) Appl. No.: 12/390,598

(22) Filed: Feb. 23, 2009

(65) Prior Publication Data

US 2010/0217864 A1    Aug. 26, 2010

(51) Int. Cl.
*G06F 15/16* (2006.01)
*H04L 29/08* (2006.01)
*G06F 9/50* (2006.01)

(52) U.S. Cl.
CPC ............ *H04L 67/32* (2013.01); *G06F 9/5072* (2013.01)

(58) Field of Classification Search
CPC .............................. H04L 67/327; G06F 9/5072
USPC .................................................. 709/223–226
See application file for complete search history.

(56) References Cited

U.S. PATENT DOCUMENTS

| | | | |
|---|---|---|---|
| 6,463,457 B1 | 10/2002 | Armentrout et al. | |
| 6,987,756 B1* | 1/2006 | Ravindranath | H04L 29/06 370/352 |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 7,930,398 B2* | 4/2011 | Kawato | G06F 9/5027 709/226 |
| 8,250,131 B1* | 8/2012 | Pulsipher | G06F 9/4843 709/201 |
| 8,768,104 B2* | 7/2014 | Moses | G06F 9/5072 382/100 |
| 2001/0039497 A1 | 11/2001 | Hubbard | |
| 2002/0069276 A1 | 6/2002 | Hino et al. | |
| 2002/0087630 A1* | 7/2002 | Wu | 709/203 |
| 2002/0165819 A1 | 11/2002 | McKnight et al. | |
| 2003/0037258 A1 | 2/2003 | Koren | |
| 2003/0110252 A1 | 6/2003 | Yang-Huffman | |

(Continued)

OTHER PUBLICATIONS

"rBuilder and the rPath Appliance Platform", 2007 rPath, Inc., www.rpath.com, 3 pages.

(Continued)

*Primary Examiner* — Hieu Hoang
(74) *Attorney, Agent, or Firm* — Lowenstein Sandler LLP (57) ABSTRACT

A cloud computing environment can be configured to allow third party, user-controlled resources to be included in the pool of resources available in the cloud, regardless of the type of system supporting the user-controlled resources. A cloud management system can identify a particular type of management system supporting the user-controlled resources and the commands necessary to communicate with the particular type of management system. Once the particular type of management system is identified, the cloud management system can communicate with the particular type of management system, utilizing the determined commands and protocols, to coordinate access to the user-controlled resources. The cloud management system can identify, allocate, and manage a set of resources from the user-controlled resources utilizing the commands and protocols.

21 Claims, 5 Drawing Sheets

(56) References Cited

U.S. PATENT DOCUMENTS

| | | |
|---|---|---|
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1* | 10/2004 | Kroening ............... 709/201 |
| 2004/0268347 A1 | 12/2004 | Knauerhase et al. |
| 2005/0117587 A1* | 6/2005 | Kawato ............ G06F 9/5027 370/395.21 |
| 2005/0131898 A1* | 6/2005 | Fatula, Jr. ....................... 707/8 |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0090005 A1* | 4/2006 | Wu .............................. 709/238 |
| 2006/0090006 A1* | 4/2006 | Wu .............................. 709/238 |
| 2006/0130144 A1 | 6/2006 | Wernicke |
| 2006/0168584 A1* | 7/2006 | Dawson ............ G06F 9/5072 718/104 |
| 2006/0177058 A1 | 8/2006 | Sarwono et al. |
| 2006/0224436 A1* | 10/2006 | Matsumoto et al. .......... 705/10 |
| 2007/0011291 A1* | 1/2007 | Mi et al. .................... 709/223 |
| 2007/0028001 A1 | 2/2007 | Phillips et al. |
| 2007/0180451 A1* | 8/2007 | Ryan ..................... G06F 9/505 718/104 |
| 2007/0226715 A1 | 9/2007 | Kimura et al. |
| 2007/0266176 A1* | 11/2007 | Wu .............................. 709/242 |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104393 A1* | 5/2008 | Glasser ............ G06F 17/30575 713/165 |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1* | 2/2010 | Stienhans et al. ............ 709/226 |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2011/0016214 A1 | 1/2011 | Jackson |
| 2011/0131335 A1 | 6/2011 | Spear et al. |

OTHER PUBLICATIONS

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan, "Methods and Systems for Abstracting Cloud Management", U.S. Appl. No. 12/474,113, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

Ferris, "Methods and Systems for Providing a Universal Marketplace for Resources for Delivery to a Cloud Computing Environment", U.S. Appl. No. 12/475,228, filed May 29, 2009.

DeHaan et al., "Systems and Methods for Power Management in Managed Network Having Hardware-Based and Virtual Reources", U.S. Appl. No. 12/475,448, filed May 29, 2009.

DeHaan et al., "Methods and Systems for Flexible Cloud Management with Power Management Support", U.S. Appl. No. 12/473,987, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan, "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/561,096, filed Aug. 31, 2009.

DeHaan, "Methods and Systems for Automated Migration of Cloud Processes to External Clouds", U.S. Appl. No. 12/551,459, filed Aug. 31, 2009.

Ferris, "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environment", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

(56) References Cited

OTHER PUBLICATIONS

Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via A Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/190,366, filed May 28, 2010.
Ferris et al., "Systems and Methods for Generating Customized Build Options for Cloud Deployment Matching Usage Profile Against Cloud Infrastructure Options", U.S. Appl. No. 12/189,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris et al., "Systems and Methods for Combinatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud incremental Billing Capture and Administration", U.S. Appl. No. 12/954,323, filed Nov. 24, 2010.
Morgan, "Systems and Methods for Aggregating Marginal Subscription Offsets in Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Gosts in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Detecting Resource consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating System", U.S. Appl. No. 13/149,750, filed May 31, 2011.
Morgan, "Systems and Methods for Introspective Application Reporting to Facilitate Virtual Machine Movement Between Cloud Hosts", U.S. Appl. No. 13/118,009, filed May 27, 2011.
Morgan, "Systems and Methods for Self-Moving Operating System installation in Cloud-Based Network", U.S. Appl. No. 13/149,877, filed May 31, 2011.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Metering Cloud Resource Consumption Using Multiple Hierarchical Subscription Periods", U.S. Appl. No. 13/037,360, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.

\* cited by examiner

COMMUNICATING WITH THIRD PARTY RESOURCES IN CLOUD COMPUTING ENVIRONMENT

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application.

In application specific computing environments, individual users may be able to add their particular computing resources to assist in performing computing processes. For example, the Search for Extraterrestrial Intelligence (SETI) program allows individual users to contribute the processing power of their personal systems for performing mathematical computations on experimental data. In these application specific computing environments, the user is required to acquire and install an application that can specifically communicate with the computing environment. As such, these environments cannot be extended to computing systems that lack the specific application or that are not compatible with the application.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for extending cloud resources to third party resources. More particularly, embodiments relate to platforms and techniques in which a cloud computing environment can allocate user-controlled resources to the cloud independent of a computer system supporting the user-controlled resources.

According to embodiments, a cloud computing environment can be configured to allow third party, user-controlled resources to be included in the pool of resources available in the cloud, regardless of the type of system supporting the user-controlled resources. To achieve this, a cloud management system can be configured to include a translation engine. The translation engine can be configured to identify a particular type of management system supporting the user-controlled resources and the commands necessary to communicate with the particular type of management system.

According to embodiments, once the particular type of management system is identified, the cloud management system can be configured to communicate with the particular type of management system, utilizing the determined commands and protocols, to coordinate access to the user-controlled resources. The cloud management system can be configured to identify, allocate, and manage a set of resources from the user-controlled resources utilizing the commands and protocols.

By allowing a third party user to contribute resources to the cloud regardless of their system specifications, the operator of the cloud computing environment can add the resources without requiring the user to reconfigure their individual systems. As such, the operator can promote participation in the cloud computing environment by simplifying the user's involvement in providing the resources.

Figure 1:
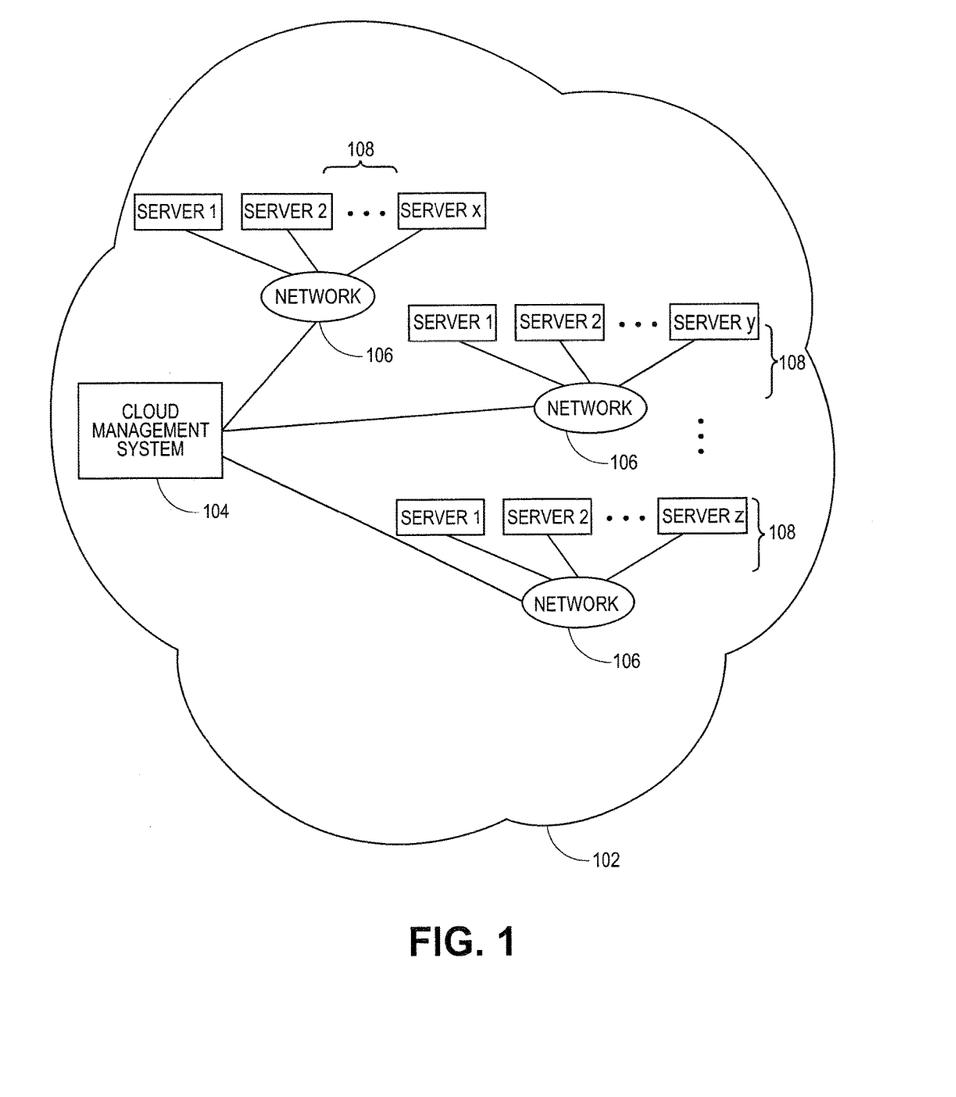
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of viral machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
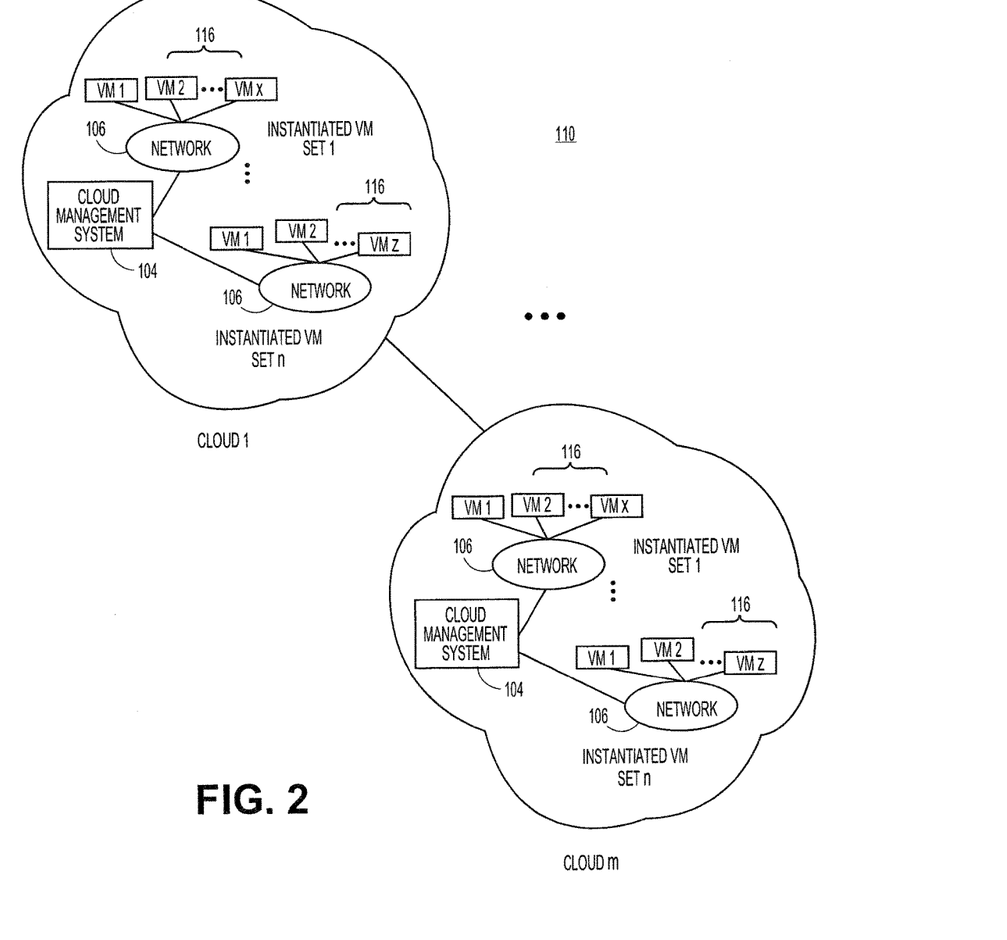
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
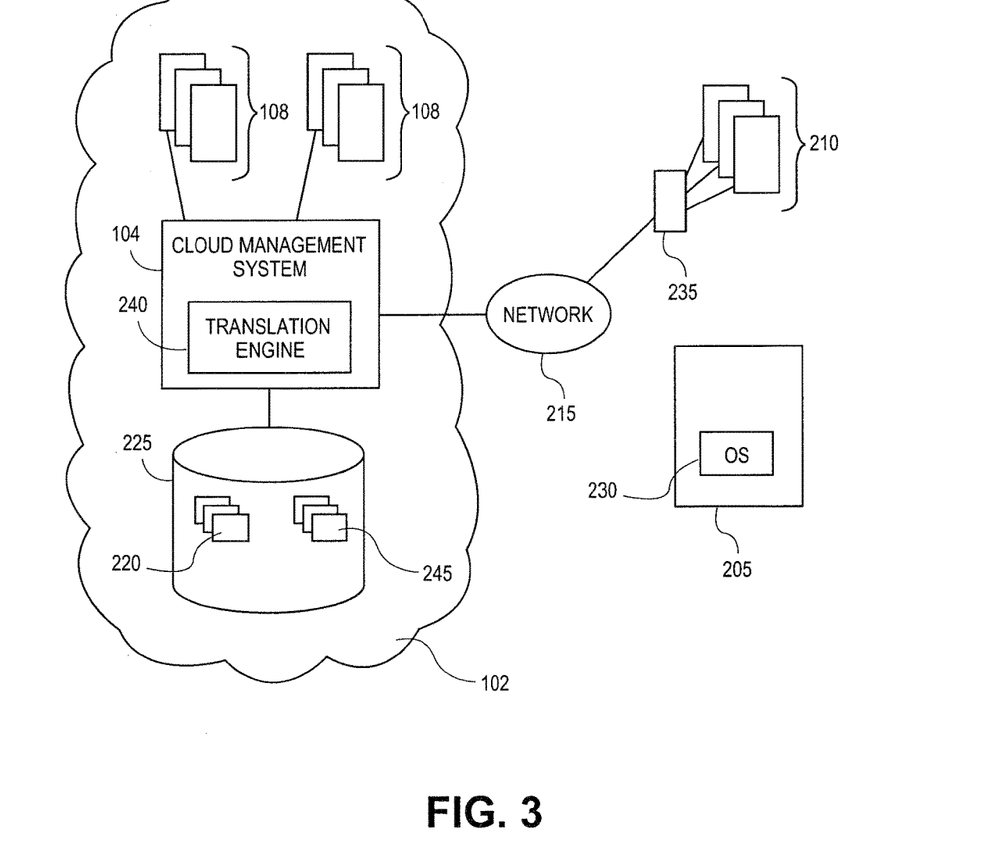
FIG. 3 illustrates an overall cloud system architecture in which user-controlled resources can be utilized as cloud resources, according to various embodiments.

FIG. 3 illustrates aspects of the cloud 102 which can interact with user-controlled resources to deliver cloud based resources, according to various embodiments. In embodiments, the cloud management system 104 can be configured to communicate with one or more third party, user-controlled resources 205 and 210 via network 215 to deliver cloud based resources. Network 215 can be one or more public networks, such as the Internet, and/or private networks.

In embodiments, as described above, the cloud management system 104 can be configured to control the overall management of the set of resources 108. For example, the cloud management system 104 can be configured to perform inventory management of the set of resources 108, perform network management of the set of resources 108, perform access control to the set of resources 108, perform instantiation of processes in the set of resources 108 and the like. To assist in the management, the cloud management system 104 can be configured to maintain a set of records 220 in a repository 225. The repository 225 can be any type of repository, such as a database. The set of records 220 can include the necessary information to perform the management functions on the set of resources 108. For example, the set of records 220 can include records containing the identification and configuration of the set of resources 108, records containing network identification and configuration of the set of resources 108, recording containing access control identification and specifications for the set of resources 108, records identifying and describing processes instantiated on the set of resources 108, and the like.

In embodiments, the management functions of the cloud management system 104 can be achieved utilizing any type of well-known management tools, programs and/or applications such as Tivoli™ by IBM™ Corporation and OpenView™ by Hewlett Packard Corporation. Likewise, the management functions of the cloud management system 104 can be achieved utilizing proprietary tools, programs, and/or applications specific to the cloud 102. In either case, the cloud management system 104 can utilize a set of commands and protocols, which are specific to the type of management system, to manage and control the set of resources 108.

In embodiments, to extend the resources of the cloud 102, the cloud management system 104 can include resources from the one or more third party, user-controlled resources 205 and 210. The user-controlled resources 205 and 210 can be any type of computer system under the control of a user, independent of the owner or operator of the cloud 102. For example, the user-controlled resources 205 and 210 can be one or more personal computers (desktop, laptop, etc.), one or more server computers, and the like, which are under the control of individuals, companies, and the like. The user controlled resources 205 and 210 can include hardware resources, such as processors, memory, network hardware and bandwidth, storage devices, and the like, and software resources, such as operating systems (OS), application programs, and the like. The users of the user-controlled resources 205 and 210 can desire to make the user-controlled resources 205 and 210 available to the cloud 102. As such, the cloud management system 104 can utilize the user-controlled resources 205 and 210 in the set of resources 108 of the cloud 102 to host processes such as applications, appliances, virtual machines, and the like.

In embodiments, the resources of the user-controlled resources 205 and 210 can be managed by different types of management systems. For example, if user-controlled resources 205 include a single computer system, the particular OS 230, such as a distribution of the Linux™ operating system, the Unix™ operating system, or other open-source or proprietary operating system or platform, of the user-controlled resources 205 can be configured to manage the resources of the user-controlled resources 205. Likewise, if the user controlled resources 210 include multiple computer systems, a management system 235, such as Tivoli or OpenView, can be configured to manage the resources of the multiple computer systems. Often, the type of management system managing the user-controlled resources 205 and 210 can be different and can be different than the cloud management system 104. As such, to allocate and manage the resources provided from the user-controlled resources 205 and 210, the cloud management system 104 can be configured to communicate with different types of management systems regardless of the type of management system.

In embodiments, to achieve this, the cloud management system 104 can be configured to include a translation engine 240. The translation engine 240 can be configured to identify the type of management system utilized by the user-controlled resources 205 and 210 and communicate with the management system independent of the type of management system.

In embodiments, the translation engine 240 can be configured to maintain a set of management records 245 in the repository 225. The set of management records 245 can include a particular management record for each type of management system known to the cloud management system 104. Each particular management record can include the commands and protocols for communicating with the type of management system associated with the particular management record. For example, the set of management records 245 can include a record for Tivoli, a record for OpenView, and records for different types of OS.

In embodiments, when resources from the user-controlled resources 205 and 210 are to be added to the set of resources 108, the translation engine 240 can be configured to identify the type of management system utilized by the user-controlled resources 205 and 210. To achieve this, the translation engine 240 can be configured to receive an identification of the type of management system from the user-controlled resources 205 and 210 via network 215. Likewise, the translation engine 240 can be configured to query the user-controlled resources 205 and 210 to determine the type of management system utilized.

In embodiments, once the type of management system is identified, the translation engine 240 can be configured to search the set of records 245 for the particular record that matches the management systems of the user-controlled resources 205 and 210. Once found, the cloud management system 104 can be configured to utilize the commands and protocols contained in the particular management record to communicate with the management systems of the user-controlled resources 205 and 210. In particular, the cloud management system 104 can be configured to communicate, utilizing the commands, in order to allocate resources from the user-controlled resources 205 and 210 and perform other management functions required by the cloud 102, such as inventory control network configuration, access control, and the like.

In embodiments, for example, once the particular management record is identified, the cloud management system 104 can be configured to allocate resources from the user controlled resources 205 and 210 to the set of resources 108 utilizing the commands in the identified management record. The cloud management system 104 can be configured to retrieve commands and protocols from the particular record that allow the cloud management system 104 to communicate with the particular management system in order to access the hardware resources of the user-controlled resources 205 and 210 (e.g. processor, memory, storage devices, network interfaces, etc.) and software resources of the user-controlled resources 205 and 210 (operating systems, application programs, etc.). For example, if the user-controlled resources 205 are managed by a type of OS, the cloud management system 104 can be configured to retrieve commands and communicate with the type of OS in order to allocate resources accessible by the cloud 102.

In embodiments, for further example, once the particular management record is identified, the cloud management 104 can be configured to communicate with the management system for the user-controlled resources 205 and 210, utilizing the commands and protocols from the identified management record, in order to establish a communications channel between the cloud and the resources, for instance, via TCP/IP, FTP or other protocols or channels. Likewise, the cloud management system 104 can be configured to provide the processes to be performed on the user-controlled resources 205 and 210 and to instantiate the processes on the set of resources 205 and 210 utilizing the commands and protocols from the identified management record. As described above, when communicating with the user-controlled resources 205 and 210, the cloud management system 104 can be configured to utilize any known security protocols between the user-controlled resources 205 and 210 and the cloud 102. For example, the cloud management system 104 can be configured to perform authentication (secure login, passwords checks, digital signatures authentication, digital certificate authentication, etc), communication encryption (symmetric cryptography, asymmetric cryptography, etc.), and the like.

In embodiments, for further example, once the particular management record is identified, the cloud management system 104 can be configured to perform management functions such as inventory management, network configuration, access control, and the like, utilizing the commands and protocols from the identified management record. For instance, to manage access control, the cloud management system 104 can be configured retrieve the commands and protocols from the identified management record in order to communicate with the management system of the user-controlled resources 205 and 210 to establish desired access procedures, such as to allow access to the set of resources and limit access to the remaining resources. For example, if the user-controlled resources 205 are managed by a type of OS, such as Security Enhanced SELinux, the cloud management system 104 can be configured to retrieve commands and protocols to communicate with the SElinux in order to utilize the access control capabilities of SELinux.

In embodiments, when allocating resources to the cloud 102, the cloud management system 104 can be configured to allow the user to specify a particular set of resources accessible by the cloud 102. For example, the user may desire to allow only certain resources to be accessible by the cloud, such as a particular memory range, a particular processor, one or more storage devices, certain software resources, and the like. Likewise, the cloud management system 104 can be configured to allow the user to specify particular management systems that can access the user-controlled resources 205 and 210 and can be configured to allow the user specify particular cloud processes that can be performed on the user-controlled resources 205 and 210. Once specified, the cloud management system 104 can be configured to allocate and manage the particular set of resources as described above.

In embodiments, to specify the particular set of resources, the cloud management system 104 can be configured to receive the particular set of resources from the user-controlled resources 205 and 210, via network 215. Likewise, the cloud management system 104 can be configured to provide an interface, via the network 215, for the users of the user-controlled resources 205 and 210 to specify the particular set of resources. For example, the cloud management system 104 can be configured to generate GUIs, e.g. dialog boxes or web pages, as required, and to provide the interface for the user to select the particular set of resources to make available to the cloud 102.

In embodiments, once resources from the user-controlled resources 205 and 210 have been allocated, the cloud management system 104 can be configured to store a record of the resources in the set of records 220. The record can include information such as identification of the user-controlled resources 205 and 210, the type of management system for the user-controlled resources 205 and 210, the particular set of resources allocated to the set of resources 108, specifications of the particular set of resources, processes instantiated on the particular set of resources, and the like.

Figure 4:
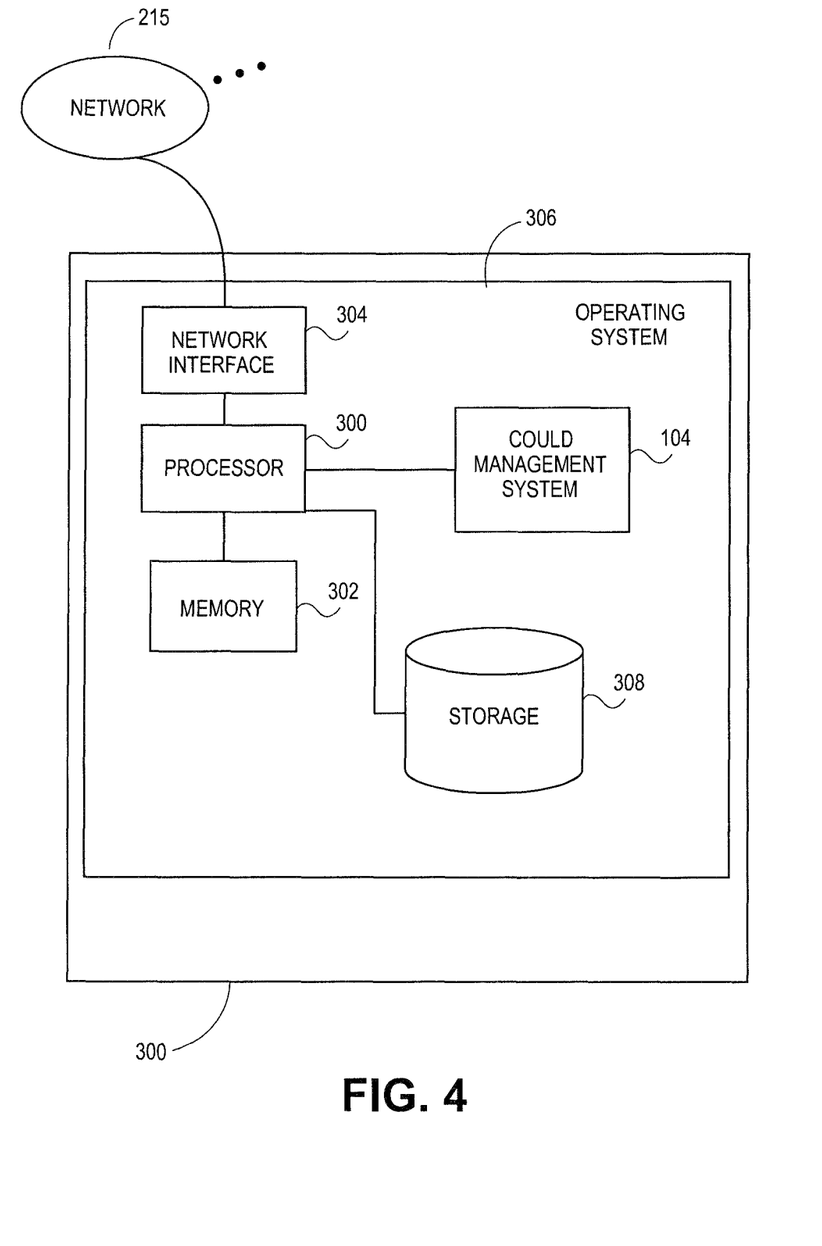
FIG. 4 illustrates an exemplary hardware configuration for a cloud management system, according to various embodiments.

FIG. 4 illustrates an exemplary diagram of hardware and other resources that can be incorporated in a computing system 300 and configured to communicate with the user-controlled resources 205 and 210 via one or more networks 215, according to embodiments. In embodiments as shown, the computing system 300 can comprise a processor 300 communicating with memory 302, such as electronic random access memory, operating under control of or in conjunction with operating system 306. Operating system 306 can be, for example, a distribution of the Linux™ operating system, such as SELinux, the Unix™ operating system, or other open-source or proprietary operating system or platform. Processor 300 also communicates with one or more storage device 308, such as hard drives, optical storage, and the like, for maintaining the repository 225 and the set of records 220 and the set of management records 245. Processor 300 further communicates with network interface 304, such as an Ethernet or wireless data connection, which in turn communicates with one or more networks 215, such as the Internet or other public or private networks.

Processor 300 also communicates with the cloud management system 104, to execute control logic and allow communication with the management systems of the user-controlled resources 205 and 210 as described above and below. Other configurations of the computing system 300, associated network connections, and other hardware and software resources are possible.

While FIG. 4 illustrates the computing system 300 as a standalone system including a combination of hardware and software, the computing system 300 can include multiple systems operating in cooperation. The cloud management system 104, including translation engine 240, can be implemented as a software application or program capable of being executed by the computing system 300, as illustrated, or other conventional computer platforms. Likewise, the cloud management system 104, including translation engine 240, can also be implemented as a software module or program module capable of being incorporated in other software applications and programs. Further, the translation engine 240 can also be implemented as a software module or program module capable of being incorporated in other management software applications and programs. In any example, the cloud management system 104, including translation engine 240, can be implemented in any type of conventional proprietary or open-source computer language.

Figure 5:
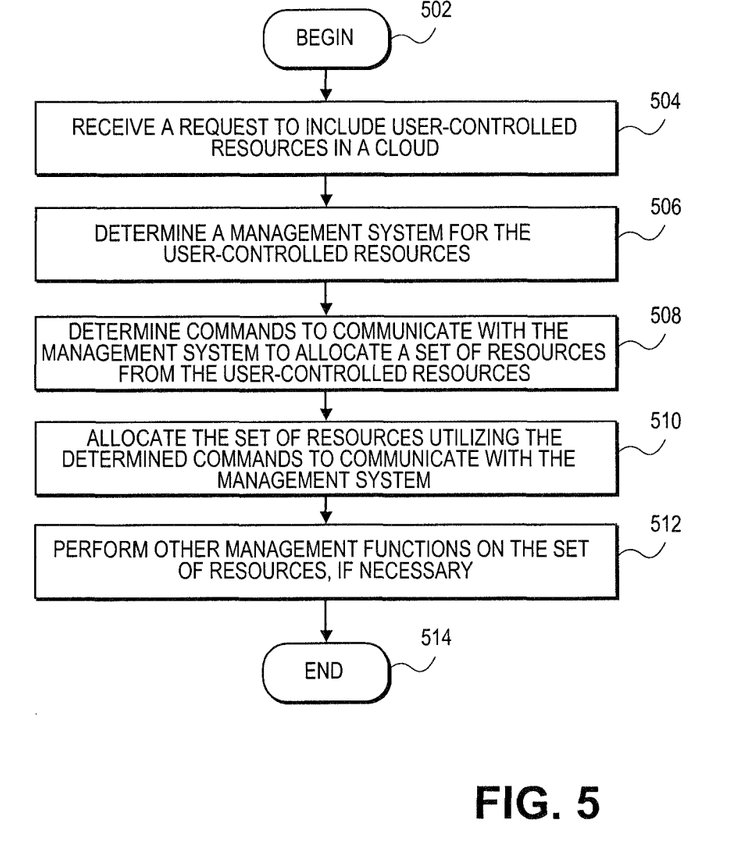
FIG. 5 illustrates a flowchart for communicating with user-controlled resources, according to various embodiments.

FIG. 5 illustrates a flow diagram of communicating with user-controlled resources in a cloud computing environment, according to embodiments. In 502, processing can begin. In 504, the cloud management system 104 can receive a request to include user-controlled resources 205 and 210 in the cloud 102. The request can originate from the cloud management system 104 or the operator of the cloud management system 104. Likewise, the third party user of the user controlled resources 205 and 210 can transmit the request to the cloud management system 104 via the network 215.

In 506, the cloud management system 104 can determine a management system for the user-controlled resources 205 and 210. For example, the translation engine 240 can be configured to receive an identification of the type of management system from the user-controlled resources 205 and 210 via network 215. Likewise, the translation engine 240 can be configured to query the user-controlled resources 205 and 210 to determine the type of management system utilized.

In 508, the cloud management system 104 can determine commands to communicate with the management system to allocate a set of resources from the user-controlled resources 205 and 210. For example, the translation engine 240 can be configured to maintain a set of management records 245 in the repository 225. The set of management records 245 can include a particular management record for each type of management system known to the cloud management system 104. Each particular management record can include the commands and protocols for communicating with the type of management system associated with the particular management record. For example, the set of management records 245 can include a record for Tivoli, a record for OpenView, and records for different types of OS.

Once the type of management system is identified, the translation engine 240 can be configured to search the set of records 245 for the particular record that matches the management systems of the user-controlled resources 205 and 210. Once found, the cloud management system 104 can be configured to utilize the commands and protocols contained in the particular management record to communicate with the management systems of the user-controlled resources 205 and 210.

In 510, the cloud management system 104 can allocate the set of resources utilizing the determined commands to communicate with the management system. For example, the cloud management system 104 can be configured to communicate, utilizing the commands, in order to allocate resources from the user-controlled resources 205 and 210. For instance, the cloud management system 104 can be configured to retrieve commands and protocols from the particular record that allow the cloud management system 104 to communicate with the particular management system in order to access the hardware resources of the user-controlled resources 205 and 210 (e.g. processor, memory, storage devices, network interfaces, etc.) and software resources of the user-controlled resources 205 and 210 (operating systems, application programs, etc.).

In 512, the cloud management system 104 can perform other management functions on the set of resources, if necessary. For example, the cloud management system 104 can perform other management functions required by the cloud 102, such as inventory control, network configuration, access control, and the like. Then, in 514, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method, comprising:
   storing, in a memory, a plurality of management records, wherein each management record comprises a management system type and a command for communicating with a management system associated with the management system type;
   receiving, by a cloud management system, a request to include a user-controlled resource in a cloud;
   querying the user-controlled resource to identify a type of a management system supporting the user-controlled resource;
   identifying, among the plurality of management records, a management record corresponding to a management system of the identified type supporting the user-controlled resource, wherein the management record identifies a first command and a second command;
   causing the user-controlled resource to be included in the cloud by communicating the first command to the management system supporting the user-controlled resource; and
   performing an access control operation with respect to the user-controlled resource by communicating the second command to the management system supporting the user-controlled resource.

2. The method of claim 1, further comprising:
   identifying the user-controlled resource to be included in the cloud.

3. The method of claim 2, wherein identifying the user-controlled resource comprises:
   receiving, via a graphical user interface, an identification of the user-controlled resource to be included in the cloud.

4. The method of claim 1, wherein the user-controlled resource comprises at least one of a memory accessible by the cloud, a processor accessible by the cloud, a storage device accessible by the cloud, or a software resource accessible by the cloud.

5. The method of claim 1, wherein the management record further identifies a third command to establish communications between the cloud and the user-controlled resource.

6. The method of claim 1, wherein the request identifies a memory range to be included in the cloud.

7. The method of claim 1, wherein the request identifies a processor to be included in the cloud.

8. The method of claim 1, wherein the request identifies a storage device to be included in the cloud.

9. The method of claim 1, further comprising:
adding the user-controller resource to a set of cloud resources instantiated in response to a user request.

10. The method of claim 1, further comprising:
instantiating, using a command identified by the management record, a process to be executed using the user-controlled resource.

11. The method of claim 1, further comprising:
performing, using a command identified by the management record, a configuration of the user-controlled resource.

12. A cloud management system, comprising:
a memory;
a processor operatively coupled to the memory, the processor to:
  store, in the memory, a plurality of management records, wherein each management record comprises a management system type and a command for communicating with a management system associated with the management system type;
  receive a request to include a user-controlled resource in a cloud;
  querying the user-controlled resource to identify a type of a management system supporting the user-controlled resource;
  identify, among the plurality of management records, a management record corresponding to a management system of the identified type supporting the user-controlled resource, wherein the management record identifies a first command and a second command;
  cause the user-controlled resource to be included in the cloud by communicating the first command to the management system supporting the user-controlled resource; and
  perform an access control operation with respect to the user-controlled resource by communicating the second command to the management system supporting the user-controlled resource.

13. The cloud management system of claim 12, wherein the processor is further to identify the user-controlled resource to be included in the cloud.

14. The cloud management system of claim 13, wherein to identify the resource the processor is further to:
receive, via a graphical user interface, an identification of the user-controlled resource to be included in the cloud.

15. The cloud management system of claim 12, wherein the user-controlled resource comprises at least one of a memory accessible by the cloud, a processor accessible by the cloud, a storage device accessible by the cloud, or a software resource accessible by the cloud.

16. The cloud management system of claim 12, wherein the management record further identifies a third command to establish communications between the cloud and the user-controlled resource.

17. A non-transitory computer readable storage medium comprising instructions to cause a processor to:
  store, in a memory, a plurality of management records, wherein each management record comprises a management system type and a command for communicating with a management system associated with the management system type;
  receive a request to include a user-controlled resource in a cloud;
  querying the user-controlled resource to identify a type of a management system supporting the user-controlled resource;
  identify, by the processor, a management record corresponding to a management system of the identified type supporting the user-controlled resource, wherein the management record identifies a first command and a second command;
  cause the user-controlled resource to be included in the cloud by communicating the first command to the management system supporting the user-controlled resource; and
  perform an access control operation with respect to the user-controlled resource by communicating the second command to the management system supporting the user-controlled resource.

18. The non-transitory computer readable storage medium of claim 17, wherein the processor is further to:
identify the user-controlled resource to be included in the cloud.

19. The non-transitory computer readable storage medium of claim 18, wherein to identify the resource the processor is further to:
receive, via a graphical user interface, an identification of the user-controlled resource to be included in the cloud.

20. The non-transitory computer readable storage medium of claim 17, wherein the user-controlled resource comprises at least one of a memory accessible by the cloud, a processor accessible by the cloud, a storage device accessible by the cloud, or a software resource accessible by the cloud.

21. The non-transitory computer readable storage medium of claim 17, wherein the management record further identifies a third command to establish communications between the cloud and the user-controlled resource.

* * * * *